Oct. 8, 1940.  P. OLLAGNON  2,216,982
HAND-ACTUATED CARRIAGE
Filed May 12, 1939  2 Sheets-Sheet 1

INVENTOR
Paul Ollagnon
By Alexander & Dowell
ATTORNEYS

Oct. 8, 1940. P. OLLAGNON 2,216,982
HAND-ACTUATED CARRIAGE
Filed May 12, 1939  2 Sheets-Sheet 2
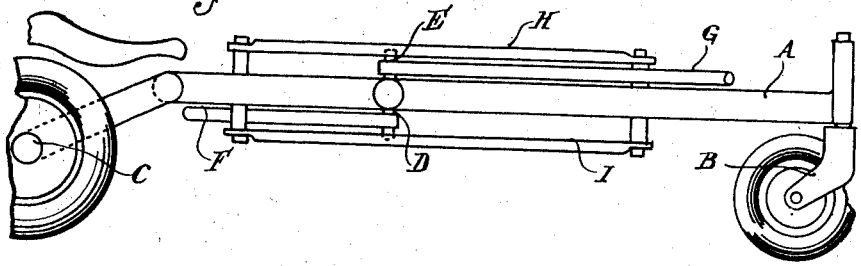
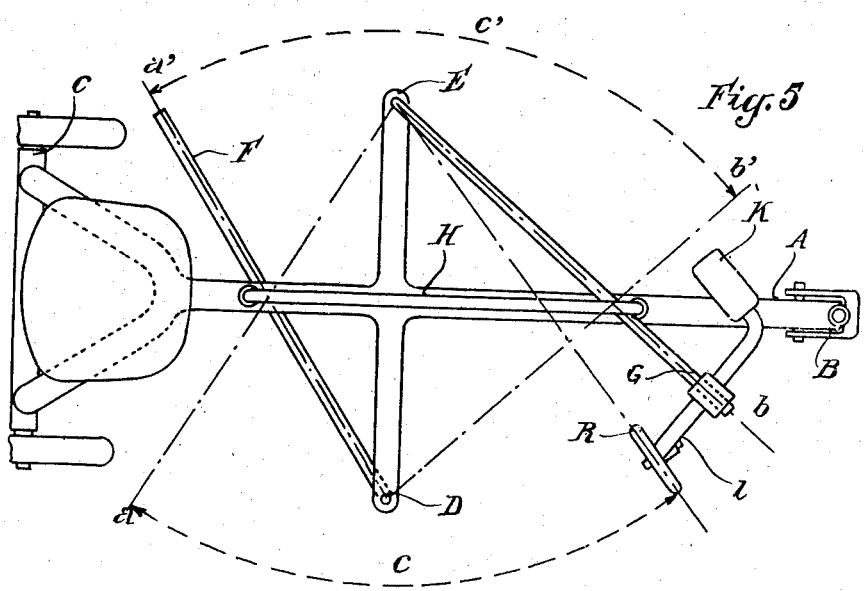
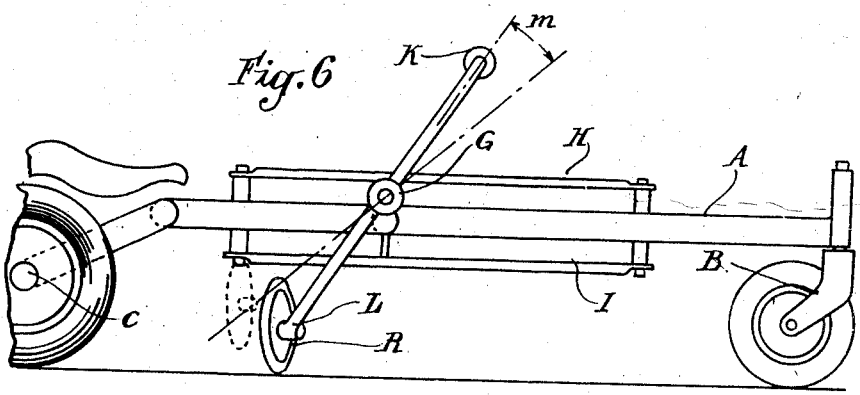

Patented Oct. 8, 1940

2,216,982

UNITED STATES PATENT OFFICE 2,216,982

HAND-ACTUATED CARRIAGE

Paul Ollagnon, Saint-Etienne, France

Application May 12, 1939, Serial No. 273,322
In France May 19, 1938

5 Claims. (Cl. 280—242)

The present invention has for its object a mechanism enabling the rider of a wheeled carriage provided with a loose steering gear to propel and direct the vehicle by means of hand-actuated arms or levers acting on the ground as the oars of a boat act on water.

Figure 1:
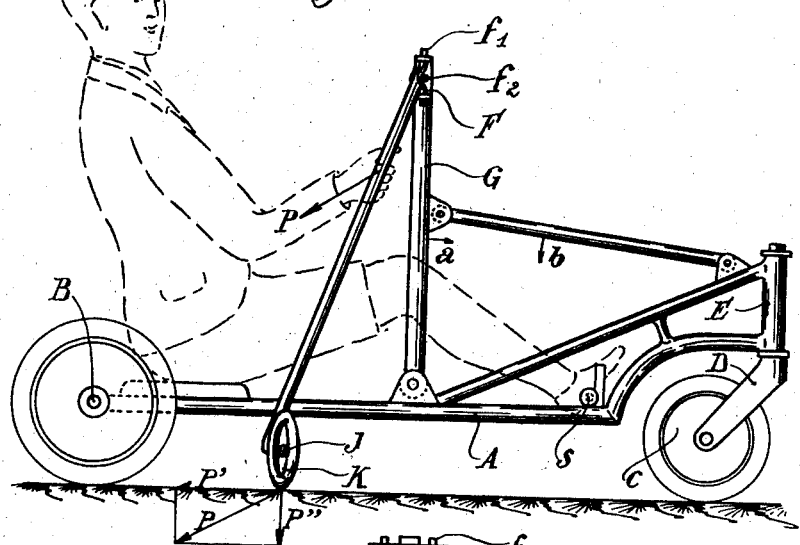
Figure 2:
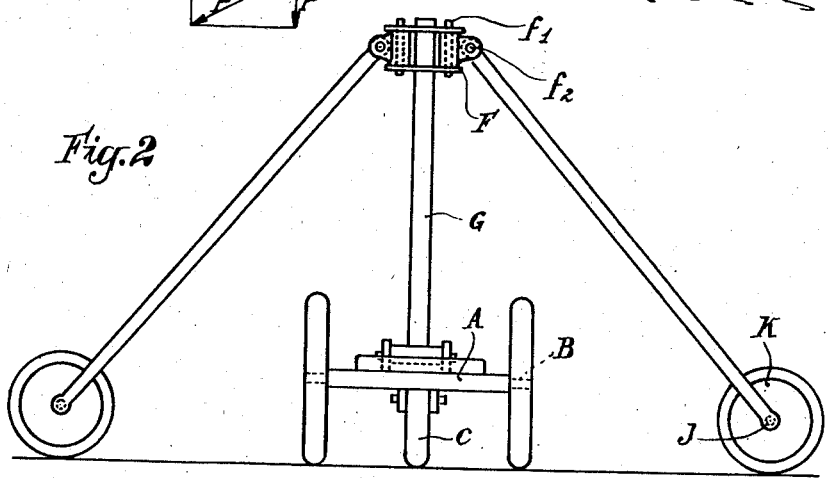
Figure 3:
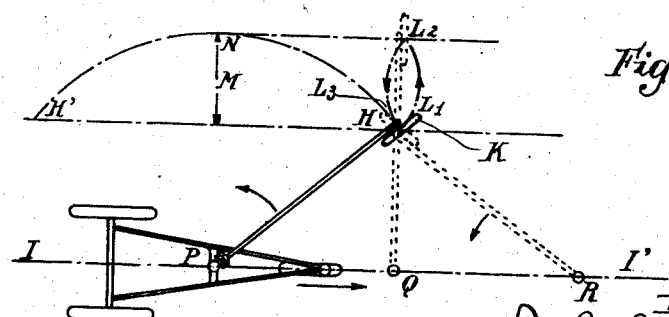

In the annexed drawings:
Fig. 1 is a side view.
Fig. 2 is a rear end view.
Fig. 3 is a diagrammatical plan view.
Fig. 4 is a side view of a modification.
Fig. 5 is the corresponding plan view.
Fig. 6 is a side view showing the operation.

In Fig. 1 the carriage comprises a frame A, two wheels loosely mounted on a rear axle B and a front wheel C supported by a fork D freely pivoted within a tube E disposed in front of the wheel axis as in a castor-wheel. Such a carriage may be pushed in any direction.

Frame A carries a central standard G (Fig. 1). At the top of this standard there are provided two vertical axes $f1$ and two horizontal axes $f2$, each pair carrying an oar such as $f2J$ which reach the ground obliquely respectively at the right and at the left of the vehicle.

Each oar, such as $f2J$, is thus freely rotatable about $f1$ within an angle HNH' (Fig. 3) and its end J may be raised above ground, but it cannot rotate about its own longitudinal axis.

Each oar such as $f2J$ carries at its lower end a journal such as J disposed perpendicularly with respect to the longitudinal axis of the oar itself and in parallel relation with respect to the ground. Each journal carries a roller such as K through which the corresponding oar rests on the ground and since the oar is unable to rotate about its own axis, such roller will always remain perpendicular to the ground. It is important to remark that the plane of roller K substantially passes through axis $f1$.

The rider (Fig. 1) is seated on a seat near the rear axle, with his feet resting on a cross-member S at the front, the standard G between his legs and each of his hands holding an oar. The operation is as follows:

The rider lifts the oars above the ground and pushes the same forward. Then he lowers them until they rest on the ground and he exerts on the same an oblique pull P (Fig. 1) directed downwardly and rearwardly. This pull is quite natural when the oars are seized near enough of their pivots. It prevents rollers K from slipping on the ground and ensures the propulsion.

As clearly shown in Fig. 3, roller K compensates the arcuate displacement of the end of the oar with respect to any motion of the vehicle, for example rectilinear.

During the first part of the pulling operation, when the standard moves from P to Q (Fig. 3), roller K moves along a curve L1 L2. When the standard moves from Q to R, roller K moves along a curve L2 L3 symmetrical with respect to L1 L2. It may thus be said that each roller K enables the corresponding oar to act as if it were operating in water. The rollers roll transversely and compensate the height M of the arc HNH'.

If only one oar is actuated the vehicle is submitted to a lateral force and turns to the right or to the left owing to the free swinging of fork D.

In the modification of Figs. 4 to 6 the central standard is dispensed with and the pressure of the rollers on the ground is automatically provided under the action of the horizontal driving pull.

The frame A is substantially similar to the case of Figs. 1 to 3, but it is provided with a cross-bar DE (Fig. 5). The oars are respectively pivoted about vertical pivots at the ends E and D of the said cross-bar.

Each oar comprises an arm such as EG and an oscillatable lever KGL carrying the roller R and the actuating handle K.

Each arm EG or DF is maintained in an horizontal plane about its pivot E or D respectively above or below frame A, by means of bars H and I respectively secured to and spaced from the top and bottom of frame A. This arrangement reduces the width of the vehicle while preserving the independence of each oar along its path $acb$ or $a'c'b'$.

At the free end of each arm there is provided an oscillatable lever loosely mounted on the end itself, at G for instance. In Fig. 6, arm EG is supposedly disposed perpendicularly to the frame for the sake of clearness. The lever carries at its upper end, above the frame, the actuating handle K and at its lower end L the ground roller R. The lower portion, including the roller, has such a length GLR that the lever is oblique when roller R rests on the ground. The arrangement is such that roller R is substantially perpendicular to the ground, its plane passing through or near the vertical pivot E of the oar under consideration.

An appropriate abutment, not illustrated, limits the angle of oscillation of lever KGL to a small angle $m$ (Fig. 6).

The other oar DF is similar to the first one described, though the details have not been figured for the clearness of the drawings.

The operation is as follows:

When the rider pushes forward the handles K, lever GK is first oscillated clockwise through angle m and roller R is raised from the ground. The whole oar comprising arm GE and lever KGLR is then oscillated forwardly about pivot E.

When the rider pulls handle K, roller R is first strongly pressed against the ground and then the vehicle is moved forwardly.

If it were desired to run backwards, lever KGL could be inverted in such a way that roller R be applied against the ground when handle K is pushed.

I claim:

1. A hand-actuated carriage comprising in combination a wheeled frame; two arms pivoted on said frame each about an horizontal axis and a vertical axis; and a roller loosely carried at the end of each of said arms, the plane of each roller being substantially vertical and passing through the vertical axis of the corresponding arm.

2. A hand-actuated carriage comprising in combination a frame; an axle carried by said frame at one end thereof; wheels loose on said axle; a self steering wheel carried by said frame at the opposed end thereof; two arms pivoted on said frame each about an horizontal axis and a vertical axis; and a roller loosely carried at the end of each of said arms, the plane of each roller being substantially vertical and passing through the vertical axis of the corresponding arm.

3. A hand-actuated carriage comprising in combination a wheeled frame; two arms pivoted on said frame each about an horizontal axis and a vertical axis; a roller loosely carried at the end of each of said arms, the plane of each roller being substantially vertical and passing through the vertical axis of the corresponding arm; and means providing pressure of said rollers onto the ground in proportion to the tractive pull exerted on said arms.

4. A hand-actuated carriage comprising in combination a wheeled frame; a vertical standard carried by said frame in front of the rider of the same; two arms pivoted on said standard at a height substantially above the rider's shoulders, each about an horizontal axis and a vertical axis; and a roller loosely carried at the end of each of said arms, the plane of each roller being substantially vertical and passing through the vertical axis of the corresponding arm.

5. A hand-actuated carriage comprising in combination a wheeled frame; a cross bar carried by said frame; two arms pivoted about a vertical axis respectively at each end of said cross bar; means to retain said arms in two superimposed horizontal planes; a lever loose on the free end of each one of said arms; a roller loosely carried at the lower end of each of said levers, the plane of each roller being substantially vertical and passing through the vertical axis of the corresponding arm; and an actuating handle at the upper end of each of said levers.

PAUL OLLAGNON.